United States Patent [19]

Mrowiec et al.

[11] Patent Number: 5,495,381

[45] Date of Patent: Feb. 27, 1996

[54] PROTECTION SYSTEM FOR UNDETECTED OVER VOLTAGE IN AN ISOLATED VOLTAGE REGULATOR

[75] Inventors: David J. Mrowiec, Rockford, Ill.; Jef W. Good, Beloit, Wis.

[73] Assignee: Sundstrand Corporation, Rockford, Ill.

[21] Appl. No.: 343,382

[22] Filed: Nov. 22, 1994

[51] Int. Cl.⁶ .................................................. H02H 7/06
[52] U.S. Cl. ................................................ 361/20; 361/79
[58] Field of Search .................................. 361/20, 21, 92, 361/93, 94, 52, 65, 35–36, 79; 322/22–25, 69; 323/284–285

[56] References Cited

U.S. PATENT DOCUMENTS

| | | | |
|---|---|---|---|
| 3,612,982 | 10/1971 | Jones et al. | 322/28 |
| 3,631,321 | 12/1971 | Eisenstadt | 317/13 R |
| 3,699,431 | 10/1972 | Paddison et al. | 324/51 |
| 3,963,964 | 6/1976 | Mustaphi | 317/27 R |
| 4,839,575 | 6/1989 | MacFarlane | 322/25 |
| 4,933,803 | 6/1990 | Kalivas | 361/85 |
| 5,206,776 | 4/1993 | Bodenheimer et al. | 361/20 |

*Primary Examiner*—A. D. Pellinen
*Assistant Examiner*—Michael J. Sherry
*Attorney, Agent, or Firm*—Jeffery J. Makeever

[57] ABSTRACT

A system of protection for an electric power generating system having a poly-phase generator switchably coupled through a generator control breaker to a load distribution bus, wherein the generator output voltage is controlled by a generator control unit which utilizes isolated voltage and current sense signals having a magnitude proportional to the output voltage and current for each phase of the poly-phase generator, the isolated voltage and current sense signals being generated by isolated voltage and current sensors, comprises a first circuit for monitoring the magnitude of each of the isolated voltage sense signals and generating a first output control signal if the magnitude of any isolated voltage sense signal is below a first predetermined threshold. The system further comprises a second circuit for monitoring the magnitude of each of the isolated current sense signals and generating a second output control signal if the magnitude of any isolated current sense signal is below a second predetermined threshold. A logic circuit is included which is responsive to the first and the second control signals, and to the generator control breaker for generating a protective trip signal for de-exciting the generator and opening the generator control breaker. Preferably, this signal is delayed for a predetermined period of time which is set to a value based on maximum generator output voltage and applicable standards for abnormal voltage transients to ensure that the standards are not exceeded by the maximum generator output voltage.

15 Claims, 4 Drawing Sheets

5,495,381

PROTECTION SYSTEM FOR UNDETECTED OVER VOLTAGE IN AN ISOLATED VOLTAGE REGULATOR

FIELD OF THE INVENTION

The instant invention relates to protection systems, and more particularly to a protection system for an electric power generating system which protects utilization equipment against an undetected over voltage fault condition resulting from a failed phase voltage sense lead and a sense ground fault.

BACKGROUND ART

An electric power generating system (EPGS) typically conforms to the structure illustrated in FIG. 1. This structure couples a generator 100 through power feeders 102 to a generator control breaker (GCB) 104. This GCB 104 couples the power generated by the generator 100 to a load bus 106 to which are coupled various utilization equipment. Often, at least a second path to supply power to the load bus 106 is provided to ensure continued supply of electrical energy to the utilization equipment when the generator 100 is not operating. This second path is provided through the bus tie breaker 108 which couples other sources of power via the tie bus 110. The quality of electric power which will be supplied to the load bus 106 is governed in most EPGS's by various standards and specifications. In aerospace applications, for example, the power quality which must be maintained for the utilization equipment is governed by either airframe manufacturer or other industry specifications such as, for example, MIL-STD-704. As shown in FIG. 2, a typical power quality specification defines the acceptable levels and times for which various "abnormal" voltage levels may exist before the system must go off line. Line 126 defines the maximum acceptable voltage envelope, and line 128 defines the minimum acceptable voltage envelope during abnormal conditions. Utilization equipment designers know of these limits and design their power supplies accordingly. Any out of specification performance by the EPGS risks serious damage to many pieces of utilization equipment.

To control the output voltage of the generator 100 within these limits, a generator control unit 112 senses various system parameters such as voltage produced and current supplied by the generator 100, as well as other system status and operational parameters. A voltage regulator 130 within the GCU 112 continually adjusts the generator output to maintain power quality to the utilization equipment. External environmental conditions may require the use of an isolated voltage regulator to ensure proper operation and regulation of the generator output. As an example, voltage regulators used in aerospace applications must operate properly under high electromagnetic interference conditions which may be encountered in flight. An environmental specification, such as FAR/JAR-25 special provisions or DO-160C, defines an operating environment having high intensity radiated fields (HIRF) on the order of 200 volts per meter. In order for the GCU 112 to operate properly in such an environment, various shielding and isolation techniques must be employed in the controller 112 design. One of these techniques requires that the generator output voltage sense inputs must be isolated to preclude the introduction of electromagnetic interference (EMI) within the control unit 112. Such isolation may be provided by, for example, isolation transformers 132, 134, and 136.

To ensure that nothing in the environment, in the voltage regulator 130, or fed back from the utilization equipment will cause sustained out of tolerance performance, a system of protection 138 is also included within the GCU 112. This system of protection 138 will trip the generator 100 off line and open the GCB 104 if the generator output power can no longer be maintained within the acceptable limits of FIG. 2, for example, to preclude any damage to the utilization equipment. If the generator output voltage is too high or too low, the GCU's over voltage or under voltage protection will take the generator 100 off line prior to exceeding a specification limit (line 126 or 128 of FIG. 2). This protection system 138 also provides protection from wiring and other system faults apart from generator output power quality protection.

To ensure maximum system safety and to preclude damage to literally hundreds of pieces of utilization equipment, the GCU 112 is also required to properly protect against performance which exceeds specification limits during multiple failures within the system. Specifically, the GCU 112 is required to provide protection against out of specification performance with one (1) passive fault and one (1) active fault in existence within the EPGS. A passive fault is a failure within the EPGS which does not cause system performance to exceed acceptable limits. A passive fault may also be undetectable and may exist for a significant period of time before it is annuciated to the maintenance crew. An active fault, on the other hand, is one which causes an immediate system disturbance which requires immediate protective action to maintain system performance within specification limits. To satisfy this requirement certain system redundancies and back-up protections are designed into the GCU 112.

A problem meeting this requirement exists, however, for systems utilizing isolated inputs which are required to meet environmental requirements as described above. For these systems, the loss of the generator output voltage sense return line 114 is a passive fault. Because the output voltage of the generator 100 is typically balanced, the voltage on the three phase voltage sense lines 116, 118, and 120 cancel each other at their junction. Since, under normal conditions, no current flows in this neutral line 114, its loss has no immediate system effect and is therefore classified as a passive fault. This fault may introduce a slight variation in output voltage regulation due to slight imbalances in the output voltage phases, but since no out of specification performance occurs, no system action is taken in response thereto. The problem arises if the active fault which occurs during the existence of this passive fault is the loss of one of the generator output voltage sense lines, for example line 116 goes open circuit. Once this occurs, the remaining two input voltages 118, 120 are no longer balanced by the third phase input 116, and form a phase-to-phase circuit as illustrated in FIG. 3. What was originally three individual phase-to-neutral voltage sense signals, in the presence of this passive and active fault, becomes a single phase-to-phase voltage sense signal coupled across two isolation transformer secondaries 122 and 124. Specifically, the GCU 112 senses that the phase with the open sense input 116 is zero volts, and the other two phase voltages, $V_{sense}$, are each ½ of the phase-to-phase voltage or 0.866 of the actual phase-to-neutral voltage calculated as $$V_{SENSE} = \frac{\sqrt{3}}{2} \cdot V_{PHASE} \quad (1)$$

where $V_{phase}$ is the phase-to-neutral voltage.

As a result of this fault, both the voltage regulator control and the system protection logic sense a low average voltage.

To compensate for what it believes to be an abnormally low generator output voltage (zero volts for one phase and 99.6 volts for the other two phases (0.866×115 Vrms=99.6 Vrms)), the voltage regulator increases the excitation to the generator. In response, the generator output voltage is increased. Typically for an unfaulted system, as the generator output voltage increases, a high phase limiting control will ensure that the voltage regulator does not inadvertently allow any individual phase voltage to exceed a maximum set limit. This control will prevent the voltage regulator from increasing the generator output voltage beyond acceptable limits in the presence of a single phase sense line failure or an open phase in an attempt to maintain the three phase average voltage at 115 Vrms. If this high phase limiter function were not included in the voltage regulator 130, with one phase at zero volts, the other two phases would be increased to 172.5 Vrms ((0 Vrms+ 172.5 Vrms+172.5 Vrms)/3=115 Vrms). However, since the two phases which are being sensed are only one half of the phase-to-phase voltage, or 0.866 of their normal phase-to-neutral voltage, the high phase limiting control does not limit the voltage regulator 130 at its normal level of 120 Vrms phase-to-neutral, but in fact allows the voltage regulator 130 to increase the generator output voltage to approximately 140 Vrms phase-to-neutral.

While this voltage level is acceptable for a period during abnormal transient conditions, it must, nonetheless, be removed from the load bus 106 in less than two (2) seconds as defined by line 126 of FIG. 2. However, as described above and illustrated in FIG. 3, neither the voltage regulation 130 nor the system protection 138 can correctly monitor the line-to-neutral output voltage since both must utilize the isolated sense inputs. As a result, the system over voltage protection, which would normally trip the generator 100 off line if the highest output phase-to-neutral voltage exceeds a set threshold for an inverse period of time, does not operate because the voltage level of the highest phase is "thought" to be only 120 Vrms (139 Vrms (actual)×0.866= 120 Vrms). The protection system will trip the generator 100 off line in approximately 10 seconds, however, based on a sensed under voltage fault. This unlikely system trip occurs because the under voltage fault protection system utilizes the average three phase output voltage to determine the presence of an under voltage fault. Here, the absence of one phase input to the GCU 112, due to the opening of line 116, results in a three phase average voltage of less than the under voltage trip threshold, even with the actual elevated generator output voltage. Although the generator 100 is tripped off line after the occurrence of the active fault, an over voltage condition is allowed to exist on the load bus 106 for greater than the period allowed by the power quality specification limits (see line 126, FIG. 2). The result of this passive/active fault combination may be damage to the utilization equipment coupled to the load bus 106 due to the duration of exposure to the high generator output voltage.

This situation becomes even more severe if a second phase sense line, for example line 118 of FIG. 3, goes open circuit. As will be apparent to one skilled in the art, with line 118 open no voltage will be sensed by the isolation transformer secondaries 122 and 124. This will result in zero volts being sensed on all three phases. The voltage regulator will continue to increase the excitation to the generator 100 in an effort to increase the average three phase voltage to 115 Vrms. This increase in excitation will continue until either the exciter driver reaches a current limit or the generator output voltage reaches saturation. In a typical application, the generator output voltage may very well reach 160 Vrms.

As described above, this extremely high output voltage will remain connected to the load bus 106 for the duration of the under voltage time delay, currently approximately 10 seconds.

The instant invention is directed at overcoming these problems by tripping the generator off line within the over voltage specification limits during the existence of a passive ground fault and any number of active phase sense input faults which have been heretofore unprotected.

SUMMARY OF THE INVENTION

It is the principle objective of the instant invention to provide a system of protection for an electrical power generating system (EPGS) which will preclude the out-of-specification performance during the existence of a passive fault in combination with an active fault. Specifically, it is the principle objective of the instant invention to provide a system of protection which will sense the existence of a passive ground fault in combination with an active phase voltage sense fault resulting in a high generator output voltage for an unacceptable period of time, and which will remove this voltage from the utilization equipment within an acceptable duration to preclude damage to the utilization equipment thereby. Additionally, it is an objective of the instant invention to provide a system of protection which will remove a high voltage for an unacceptable period of time from the utilization equipment load bus within specification limits wherein the fault is caused by a loss of voltage sense to the control unit.

In a preferred embodiment of the instant invention, a system of protection for an electric power generating system having a poly-phase generator switchably coupled through a generator control breaker to a load distribution bus, wherein the generator output voltage is controlled by a generator control unit which utilizes isolated voltage and current sense signals having a magnitude proportional to the output voltage and current for each phase of the polyphase generator, the isolated voltage and current sense signals being generated by isolated voltage and current sensors, comprises a first circuit for monitoring the magnitude of each of the isolated voltage sense signals and generating a first output control signal if the magnitude of any isolated voltage sense signal is below a first predetermined threshold. The system further comprises a second circuit for monitoring the magnitude of each of the isolated current sense signals and generating a second output control signal if the magnitude of any isolated current sense signal is below a second predetermined threshold. A logic circuit is included which is responsive to the first and the second control signals, and to the generator control breaker for generating a protective trip signal for de-exciting the generator and opening the generator control breaker. Preferably, this signal is delayed for a predetermined period of time which is set to a value based on maximum generator output voltage and applicable standards for abnormal voltage transients to ensure that the standards are not exceeded by the maximum generator output voltage.

In a highly preferred embodiment of the instant invention, the protection circuit comprises a first circuit for monitoring the magnitude of each phase of an isolated voltage sense feedback and for generating a first output control signal for each phase if the magnitude of that phase is below a first predetermined threshold. Additionally, a second circuit is included for monitoring the magnitude of each phase of an isolated current sense feedback. This second circuit generates a second output control signal for each phase if the magnitude of said phase is below a second predetermined threshold. This preferred embodiment also comprises a first logical AND circuit coupled to the first and second monitoring circuits. This AND circuit generates a phase fault sensed signal for each phase when both the first output control signal and the second output control signal are generated for a particular phase. A logical OR circuit is included for generating a fault sensed signal when any of the phase fault sensed signals are generated. This highly preferred embodiment additionally comprises a second logical AND circuit for generating a protective trip signal when said fault sensed signal is generated, when no phase is open, when the generator control breaker is closed, and when the generator status is ready. Parameters which may be monitored to determine that the generator status is ready are the speed of the generator, the status of the voltage regulator, and the status of any generator control or interlock relays to name a few. A time delay circuit is included in this preferred embodiment for delaying this protective trip signal for a predetermined period of time after the fault sensed signal has been generated and when no phase is open and when the generator control breaker is closed. This protective trip signal thereafter de-excites the generator and opens the generator control breaker.

BRIEF DESCRIPTION OF THE DRAWINGS

While the specification concludes with claims particularly pointing out and distinctly claiming that which is regarded as the present invention, the organization, the advantages, and further objects of the invention may be readily ascertained by one skilled in the art from the following detailed description when read in conjunction with the accompanying drawings in which:

DESCRIPTION OF THE PREFERRED EMBODIMENTS

Figure 1:
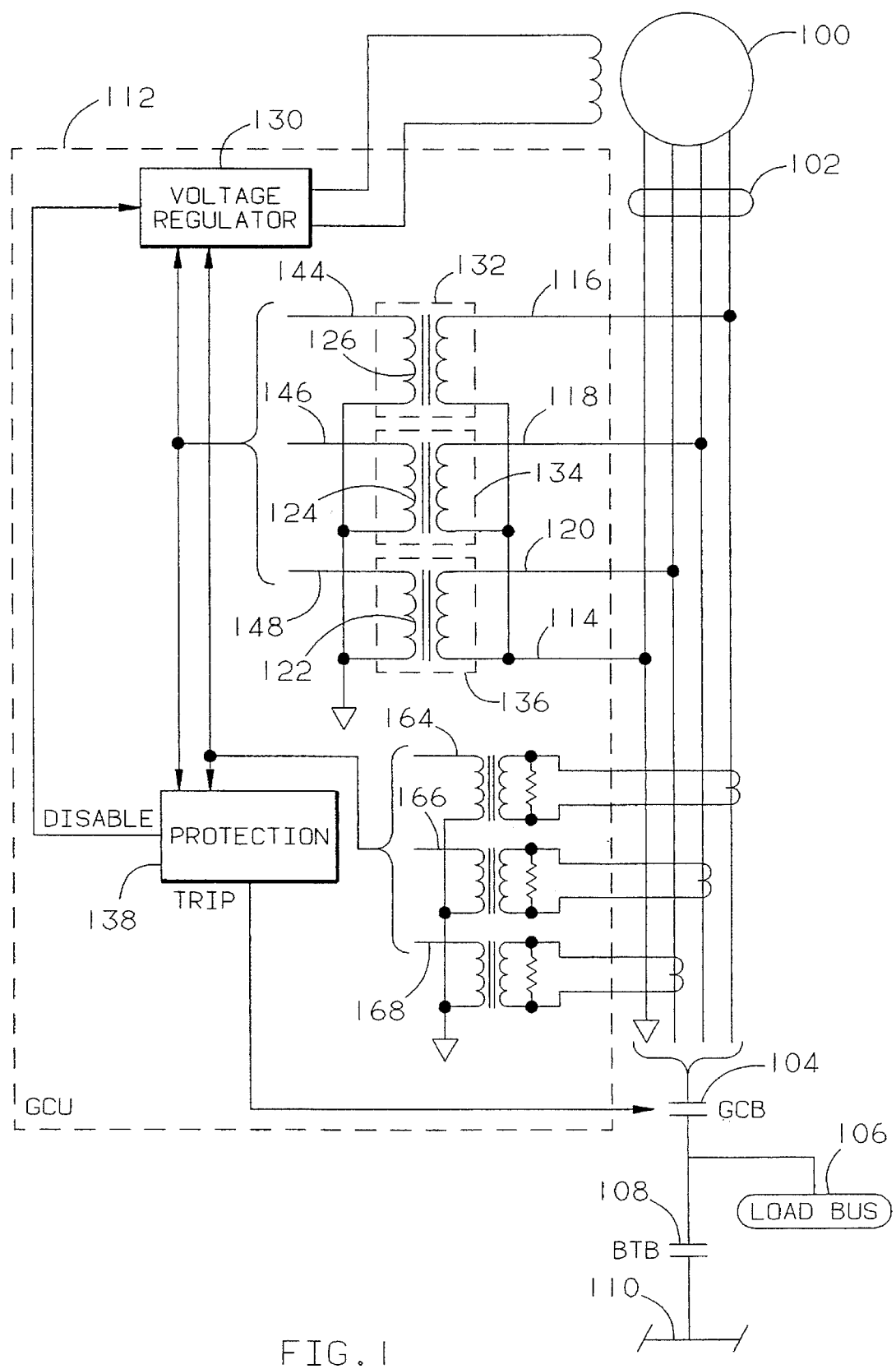
FIG. 1 is a single line schematic diagram illustrating an EPGS to which the instant invention is particularly well suited.
Figure 4:
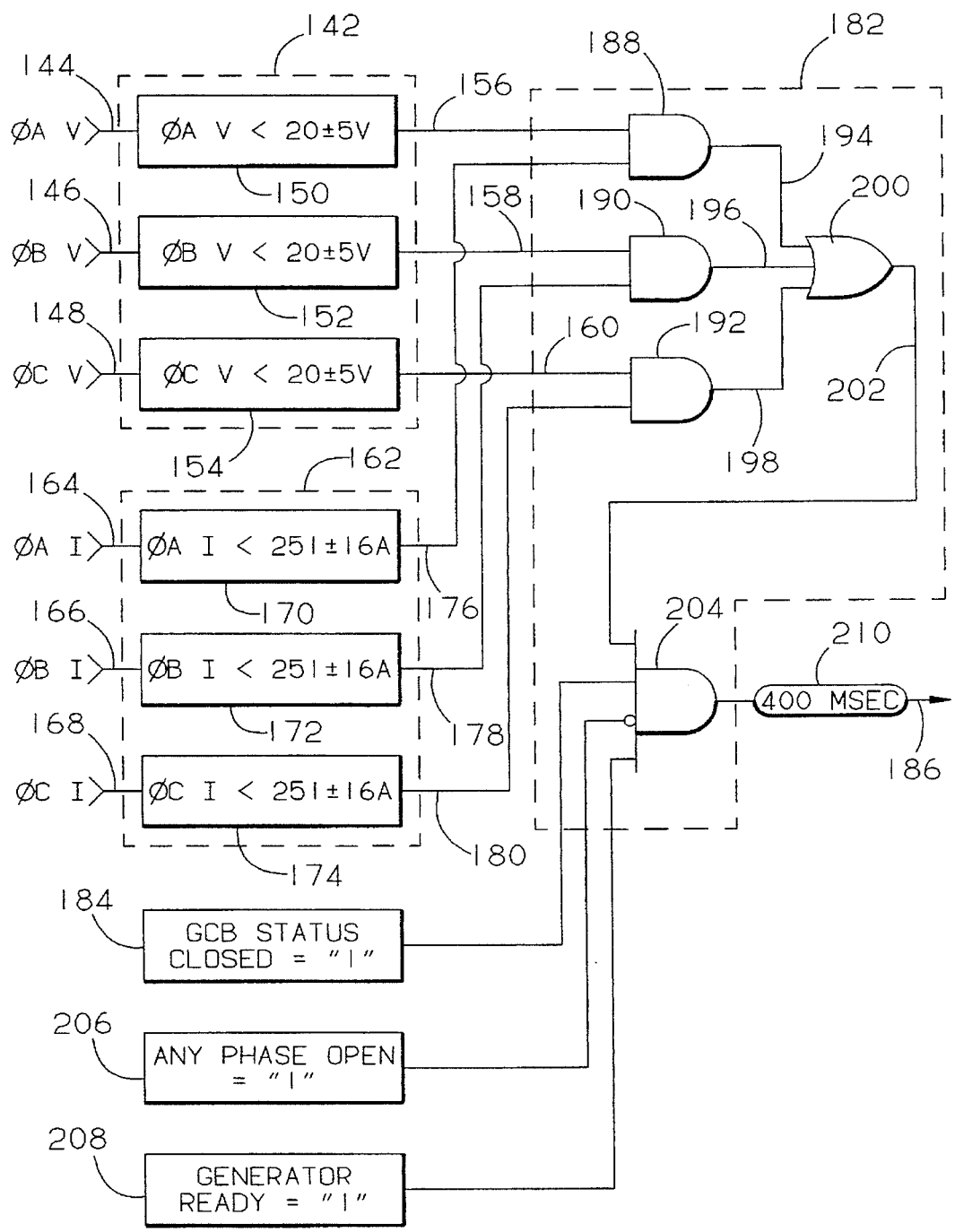
FIG. 4 is a schematic logic diagram illustrating an embodiment of the instant invention.

In a preferred embodiment of the instant invention, as illustrated in FIG. 4, a first means, such as circuit 142, monitors the magnitude of each of the isolated voltage sense, or feedback, signals 144, 146, and 148. This circuit 142 comprises individual level monitors 150, 152, and 154 which generate a first output control signal for each phase 156, 158, and 160 if the magnitude of any of the isolated voltage sense signals 144, 146, or 148 is below a first predetermined threshold. This threshold is set to a value based on the measuring tolerances and accuracy of the system which will ensure that the reading indicates a broken sense line 116 (see FIG. 1) taking into account electrical noise on the line. A value of 0.2 per unit, or approximately 20 Vrms for a 115 Vrms system, has been found to be low enough to indicate a broken sense wire 116, while being high enough to allow for induced electrical noise on the line to not "fool" the system into interpreting that the line is operational.

This preferred embodiment further comprises a second means or circuit 162 for monitoring the magnitude of each of the isolated current sense, or feedback, signals 164, 166, and 168. This circuit 162 comprises individual level monitors 170, 172, and 174 which generate a second output control signal for each phase 176, 178, and 180 if the magnitude of any of the isolated current sense signals 164, 166, or 168 is below a second predetermined threshold. This threshold is set to a value based on the system generating capacity and the current limit parameters of the generator. Preferably, this threshold is set to a value greater than 2.0 per unit current, or approximately 521 amperes for a 90/120 kVA generator. This level is chosen so to ensure that the current limit function of the GCU 112, which reduces the generator output voltage beyond 2.2 per unit current, is not the reason for the low output voltage.

In this preferred embodiment, a logic means or circuit 182 is responsive to the first output control signals 156, 158, and 160, and to the second output control signals 176, 178, and 180, and to the status of the generator control breaker (GCB) 104 (see FIG. 1) as sensed by circuit 184 for generating a protective trip signal 186. This protective trip signal 186 will be used by the GCU 112 to de-excite the generator 100 and to open the GCB 104 to remove the fault from the load bus 106 (see FIG. 1). Preferably, the logic circuit 182 comprises a first logical AND means or gate 188, 190, and 192 coupled to the first circuit 142 for generating a phase fault sensed signal 194, 196, and 198 for each phase when the first output control signal and the second output control signal are both generated for a particular phase 156 and 176, 158 and 178, and 160 and 180. This preferred logic circuit 182 further comprises a logical OR means or gate 200 which generates a fault sensed signal 202 when any of the phase fault sensed signals 194, 196, or 198 are generated. A second logical AND means of gate 204 is provided for generating a protective trip signal 186 when the fault sensed signal 202 has been generated and the GCB is closed.

Figure 2:
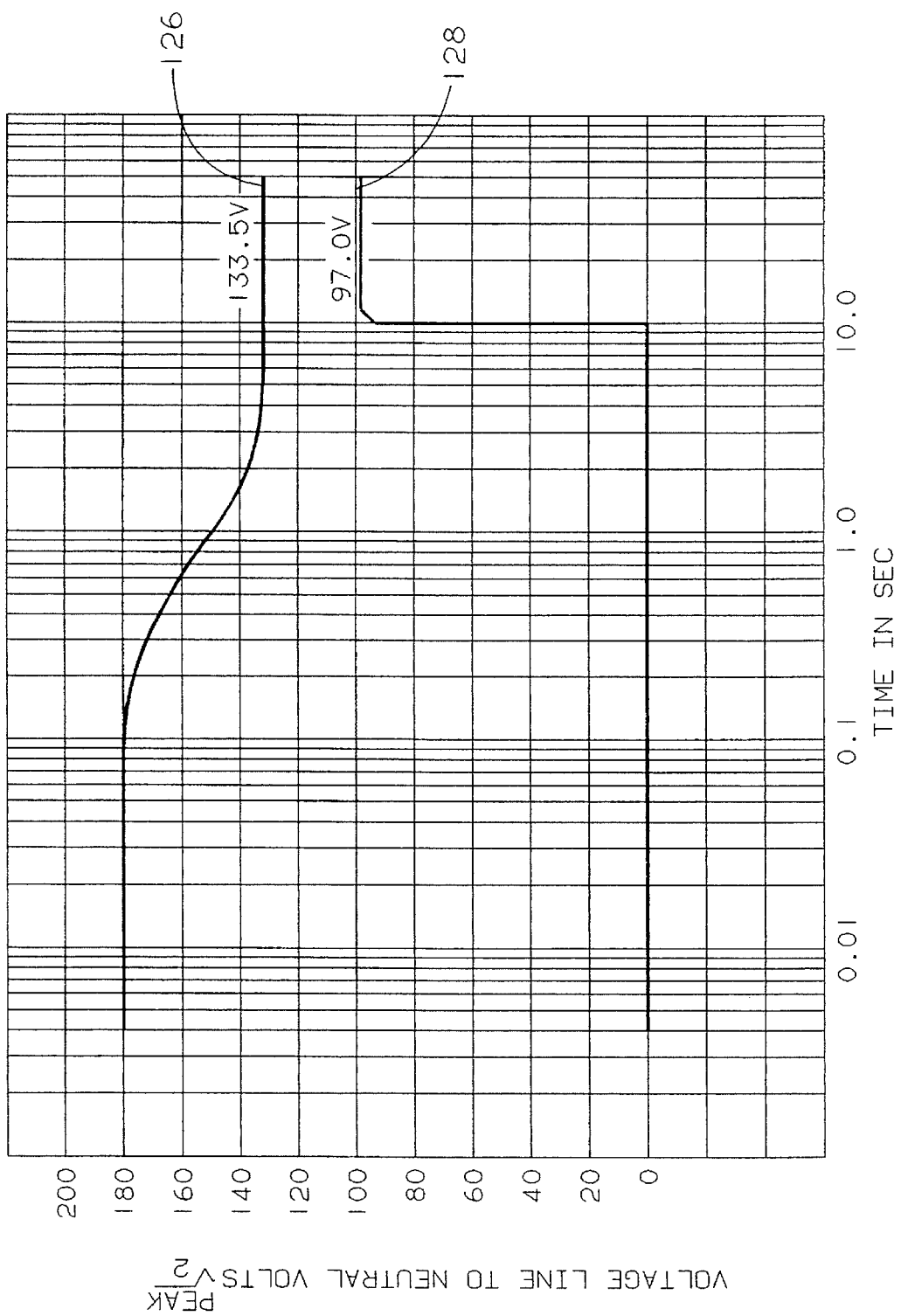
FIG. 2 is a typical "abnormal power quality limits" graph defining acceptable times and magnitudes of generator output voltages during abnormal system operation.
Figure 3:
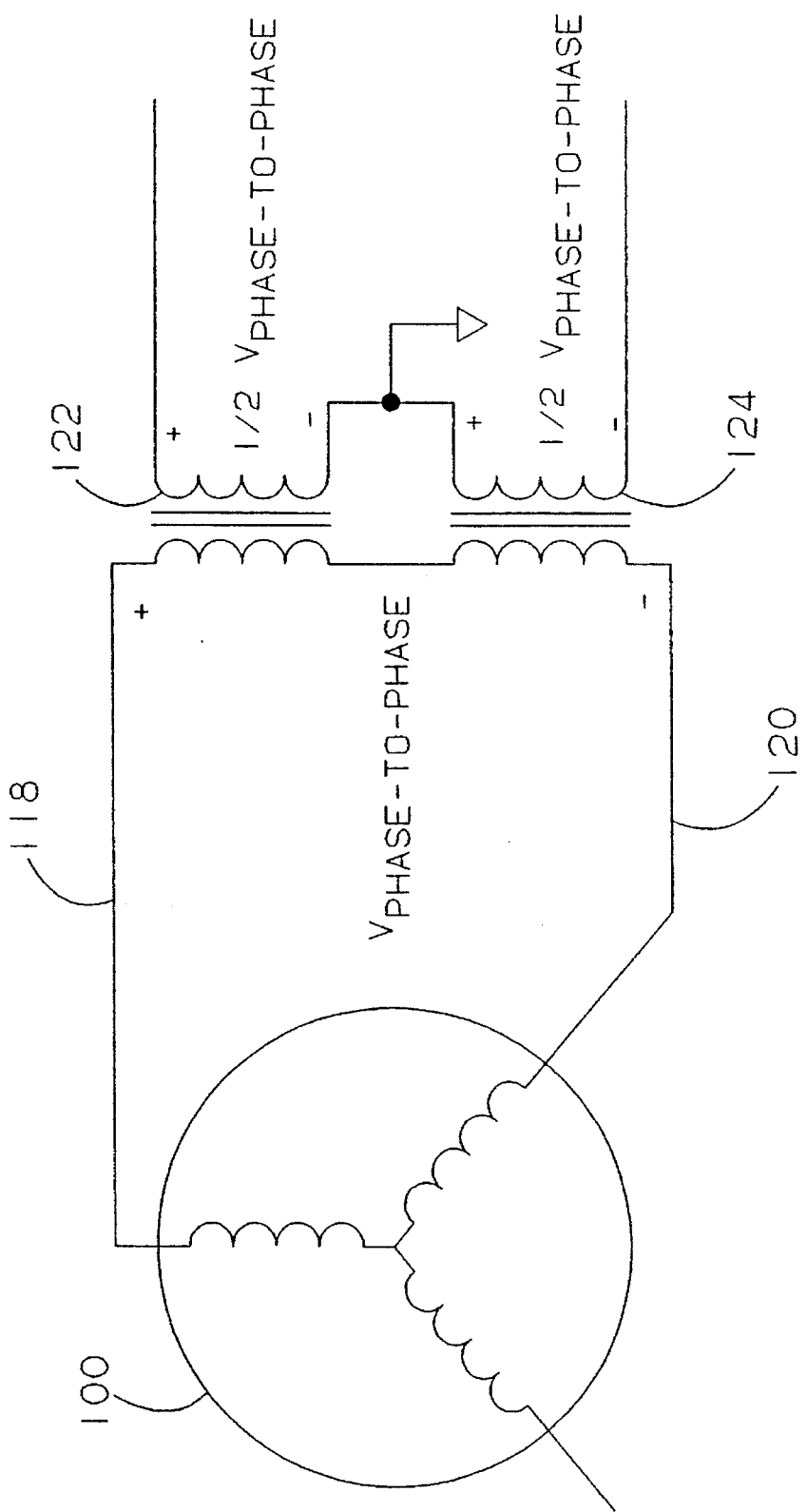
FIG. 3 is an electrical schematic of the resulting voltage sensing circuitry in the presence of a passive ground fault and an active phase voltage sense input fault.

Preferably, this protective trip signal 186 will not be generated if any phase is open as sensed by circuit 206 by means known in the art. This "lockout" is required because an open phase, depending on the location of the fault, may result in a sensed voltage of less than the first threshold and a sensed current less than the second threshold. If this protection were not locked out when an open phase is sensed, incorrect isolation and identification of the fault may result. As an additional assurance that this logic circuit 182 will not generate the protective trip signal except when an actual fault exists, AND gate 204 will only be enabled when the generator status is ready as monitored by circuit 208 as is known in the art. Parameters which may be monitored by this circuit 208 are the speed of the generator, the status of the voltage regulator 130, and the status of any generator control or interlock relays to name a few. Once the protective trip signal 186 has been generated, a time delay means 210 delays its propagation for a predetermined period of time. This period is preferably set to a value based on the maximum generator output voltage and the applicable abnormal voltage transient standard (see FIG. 2 curve 126) to ensure that the maximum limit cannot be exceeded. For a generator with a saturation voltage of approximately 160 Vrms, this delay should be set less than 600 milliseconds. Preferably, the threshold should be set to approximately 400 milliseconds which is short enough to allow breaker actuation to occur prior to exceeding curve 126 of FIG. 2, and long enough to allow settling of the sensing circuits and ensure that transients do not trigger a protective trip.

With this preferred embodiment, the occurrence of the active phase sense fault (line 116 of FIG. 1 opens for example) in addition to the passive ground fault (line 114 of FIG. 1 opens for example) will be detected as zero volts on line 144. Circuit 150 will generate a logic 1 on line 156 and assuming that the generator is not overloaded, circuit 170 will also generate a logic 1 on line 176. These two signal will cause gate 188 to generate a logic 1 on line 194 which, through gate 200, will result in a logic 1 on line 202. This signal will enable gate 204 and, assuming that the GCB 104 is closed, that no phase 102 is open, and that the generator is ready, the time delay 210 will be started. Once this time delay 210 expires, if the conditions have remained the same, the protective trip signal 186 will trip the GCB 104 and the generator 100 will be de-excited. If, however, during the duration of time delay 210 any of the conditions change, for example the GCB 104 opens or the voltage sense goes above the first threshold, gate 204 will be disabled and the time delay 210 reset. In this way, transients or changes in system conditions will not generate this protective trip signal 186.

Numerous modifications and alternative embodiments of the invention will be apparent to those skilled in the art in view of the foregoing description. Accordingly, this description is to be construed as illustrative only and is for the purpose of teaching those skilled in the art the best mode of carrying out the invention. The details of the structure may be varied substantially without departing from the spirit of the invention, and the exclusive use of all modifications which come within the scope of the appended claims is reserved.

We claim:

1. A system of protection for an electric power generating system having a poly-phase generator switchably coupled through a generator control breaker to a load distribution bus, wherein the generator output voltage is controlled by a generator control unit which utilizes isolated voltage and current sense signals having a magnitude proportional to the output voltage and current for each phase of the polyphase generator, the isolated voltage and current sense signals being generated by isolated voltage and current sensors comprising:

first means for monitoring the magnitude of each of the isolated voltage sense signals, said first means generating a first output control signal if the magnitude of any isolated voltage sense signal is below a first predetermined threshold;

second means for monitoring the magnitude of each of the isolated current sense signals, said second means generating a second output control signal if the magnitude of any isolated current sense signal is below a second predetermined threshold; and logic means responsive to said first and said second control signals, and to the generator control breaker for generating a protective trip signal for de-exciting the generator and opening the generator control breaker whenever said first output control signal and said second output control signal are generated for the same phase of the poly-phase generator.

2. The system of claim 1, further comprising a means for delaying the generation of said protective trip signal for a predetermined period of time after said first output control signal and said second output control signal have been generated for the same phase of the poly-phase generator.

3. The system of claim 2, wherein said predetermined period of time is set to a value based on maximum generator output voltage and applicable standards for abnormal voltage transients to ensure that said standards are not exceeded by said maximum generator output voltage.

4. The system of claim 3, wherein said predetermined period of time is set to less than 600 milliseconds.

5. The system of claim 3, wherein said predetermined period of time is set to approximately 400 milliseconds.

6. The system of claim 1, wherein said first predetermined threshold is set to a value less than 0.2 per unit voltage.

7. The system of claim 1, wherein said second predetermined threshold is set to a value greater than 2.0 per unit current.

8. The system of claim 1, wherein the generator control breaker must be closed for said logic means to generate said protective trip signal.

9. The system of claim 1, wherein said logic means prohibits the generation of said protective trip signal when one or more of the phases of the poly-phase generator is open.

10. A protection circuit for use in an electric power generating system having a three phase wye wound generator coupled through a generator control breaker to a load bus, the generator producing a three phase balanced ac electrical output, the magnitude of which is controlled by a voltage regulator utilizing isolated voltage and current sensing feedback for each phase, comprising:

first means for monitoring the magnitude of each phase of the isolated voltage sense feedback, said first means generating a first output control signal for each phase if the magnitude of said phase is below a first predetermined threshold;

second means for monitoring the magnitude of each phase of the isolated current sense feedback, said second means generating a second output control signal for each phase if the magnitude of said phase is below a second predetermined threshold;

first logical AND means coupled to said first means and said second means for generating a phase fault sensed signal for each phase when said first output control signal and said second output control signal are both generated for a particular phase;

logical OR means for generating a fault sensed signal when any of said phase fault sensed signals are generated;

second logical AND means for generating a protective trip signal when said fault sensed signal is generated and when no phase is open and when the generator control breaker is closed; and time delay means for delaying said protective trip signal for a predetermined period of time after said fault sensed signal has been generated and when no phase is open and when the generator control breaker is closed, said protective trip signal thereafter de-exciting the generator and opening the generator control breaker.

11. The circuit of claim 10, wherein said first predetermined threshold is set to a value less than 0.2 per unit voltage.

12. The circuit of claim 10, wherein said second predetermined threshold is set to a value greater than 2.0 per unit current.

13. The circuit of claim 10, wherein said predetermined period of time is set to a value based on maximum generator output voltage and applicable standards for abnormal voltage transients to ensure that said standards are not exceeded by said maximum generator output voltage.

14. The system of claim 10, wherein said predetermined period of time is set to less than 600 milliseconds.

15. The system of claim 10, wherein said predetermined period of time is set to approximately 400 milliseconds.

* * * * *